United States Patent
Siddiqui et al.

(10) Patent No.: US 9,058,428 B1
(45) Date of Patent: Jun. 16, 2015

(54) SOFTWARE TESTING USING SHADOW REQUESTS

(75) Inventors: Muhammad Ali Siddiqui, Snoqualmie, WA (US); Peter V. Commons, Issaquah, WA (US); Ivan Eduardo Gonzalez, Seattle, WA (US); Amos Dylan Vance, Redmond, WA (US); Kendra A. Yourtee, Seattle, WA (US); Thomas L. Keller, Renton, WA (US)

(73) Assignee: Amazon Technologies, Inc., Seattle, WA (US)

(*) Notice: Subject to any disclaimer, the term of this patent is extended or adjusted under 35 U.S.C. 154(b) by 280 days.

(21) Appl. No.: 13/445,562

(22) Filed: Apr. 12, 2012

(51) Int. Cl.
*G06F 9/44* (2006.01)
*G06F 11/36* (2006.01)

(52) U.S. Cl.
CPC .................. *G06F 11/3688* (2013.01)

(58) Field of Classification Search
None
See application file for complete search history.

(56) References Cited

U.S. PATENT DOCUMENTS

| | | | |
|---|---|---|---|
| 6,732,139 B1 | 5/2004 | Dillenberger et al. | |
| 7,076,767 B1* | 7/2006 | Williams | 717/127 |
| 7,155,462 B1 | 12/2006 | Singh et al. | |
| 7,383,541 B1 | 6/2008 | Banks et al. | |
| 7,490,319 B2* | 2/2009 | Blackwell et al. | 717/124 |
| 7,779,392 B2* | 8/2010 | Sashino et al. | 717/127 |
| 8,001,422 B1* | 8/2011 | Sun et al. | 714/25 |
| 8,499,286 B2* | 7/2013 | Lawrance et al. | 717/124 |
| 8,762,959 B2* | 6/2014 | Singonahalli et al. | 717/131 |
| 2004/0168153 A1 | 8/2004 | Marvin | |
| 2004/0172618 A1 | 9/2004 | Marvin | |
| 2004/0261070 A1 | 12/2004 | Miller et al. | |
| 2006/0143595 A1* | 6/2006 | Dostert et al. | 717/127 |
| 2007/0094651 A1 | 4/2007 | Stephens et al. | |
| 2007/0240108 A1 | 10/2007 | Dorn et al. | |
| 2007/0250631 A1* | 10/2007 | Bali et al. | 709/226 |
| 2008/0263538 A1 | 10/2008 | Bando et al. | |
| 2008/0270997 A1* | 10/2008 | Murray et al. | 717/131 |

(Continued)

OTHER PUBLICATIONS

Choi, E. Performance test and analysis for an adaptive load balancing mechanism on distributed server cluster systems. Future Generation Computer Systems, Feb. 2004, pp. 237-247. Retrieved on [Jan. 29, 2015] Retrieved from the Internet: URL<http://www.sciencedirect.com/science/article/pii/S0167739X03001389#>.*

(Continued)

*Primary Examiner* — Thuy Dao
*Assistant Examiner* — Cheneca Smith
(74) *Attorney, Agent, or Firm* — Lee & Hayes, PLLC (57) ABSTRACT

The techniques described herein provide software testing that may concurrently process a user request using a live version of software and a shadow request, which is based on the user request, using a shadow version of software (e.g., trial or test version, etc.). The live version of software, unlike the shadow version, is user-facing and transmits data back to the users while the shadow request does not output to the users. An allocation module may vary allocation of the shadow requests to enable a ramp up of allocations (or possibly ramp down) of the shadow version of software. The allocation module may use allocation rules to dynamically initiate the shadow request based on various factors such as load balancing, user attributes, and/or other rules or logic. Thus, not all user requests may be issued as shadow requests.

20 Claims, 8 Drawing Sheets

(56) References Cited

U.S. PATENT DOCUMENTS

| | | |
|---|---|---|
| 2008/0282230 A1 | 11/2008 | Belvin et al. |
| 2009/0106256 A1* | 4/2009 | Safari et al. ............... 707/10 |
| 2009/0125891 A1* | 5/2009 | Garimella et al. ............ 717/131 |
| 2009/0199160 A1* | 8/2009 | Vaitheeswaran et al. ..... 717/124 |
| 2009/0210866 A1 | 8/2009 | Troan |
| 2009/0248699 A1 | 10/2009 | Alvarez et al. |
| 2009/0293061 A1 | 11/2009 | Schwinn et al. |
| 2010/0318986 A1 | 12/2010 | Burke et al. |
| 2011/0035740 A1 | 2/2011 | Powell et al. |
| 2011/0083129 A1 | 4/2011 | Masaki |
| 2011/0289512 A1 | 11/2011 | Vecera et al. |
| 2012/0084407 A1* | 4/2012 | Soulios et al. ............... 709/220 |
| 2012/0324435 A1 | 12/2012 | Somani et al. |
| 2013/0036402 A1 | 2/2013 | Mutisya et al. |
| 2013/0124610 A1* | 5/2013 | Smith et al. ............... 709/203 |

OTHER PUBLICATIONS

Jiang et al. Automated Performance Analysis of Load Tests, IEEE International Conference on Software Maintenance, Sep. 2009, pp. 125-134, Retrieved on [Jan. 29, 2015] Retrieved from the Internet: URL<http://ieeexplore.ieee.org/xpls/abs_all.jsp?arnumber=5306331&tag=1>.*

Office Action for U.S. Appl. No. 13/445,482, mailed on Jan. 16, 2014, Muhammad Ali Siddiqui, "Software Testing Analysis and Control", 17 pages.

Office Action for U.S. Appl. No. 13/445,482, mailed on Oct. 31, 2014, Muhammad Ali Siddiqui, "Software Testing Analysis and Control", 17 pages.

Office action for U.S. Appl. No. 13/445,482, mailed on Jul. 24, 2014, Siddiqui et al., "Software Testing Analysis and Control", 22 pages.

* cited by examiner

SOFTWARE TESTING USING SHADOW REQUESTS

BACKGROUND

Software architects often engage in a process of improving software after deployment of the software. The improvements may be implemented by modifying a version of the software or by creating a new version of the software, where the modified or new version of the software is intended to replace the deployed (current) version of the software. Deployment of the modified or the new version of the software may have an impact on hardware that supports the version of the software (e.g., require more or less processing power and/or time), may impact outcomes resulting from user interaction (e.g., satisfy, annoy, or frustrate users, etc.), or may have other possible outcomes (e.g., include bugs, etc.). Therefore, it is desirable to perform a comparison test, often called A/B testing, to compare results following execution of the modified or new version of the software against results following execution of the deployed (current) version of the software prior to a full deployment of the modified or new version of the software.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed in part to software testing that may concurrently process a request using a live version of software and a shadow request, which is based on the request, using a shadow version of software (e.g., trial or test version, etc.). The live version of software, unlike the shadow version, may update system data and may transmit data back to the users while the shadow request does not output to the users. In contrast to typical A/B testing, the testing of the shadow version occurs without updating system data and thus is used primarily to test system performance when executing sample requests (shadow requests) that are based on actual requests (processed with the live version of the software). An allocation module may vary allocation of the shadow requests to enable a ramp up of allocations (or possibly a ramp down) of the shadow version of software. The allocation module may use allocation rules to initiate the shadow request based on various factors such as load balancing, user attributes, and/or other rules or logic. Thus, not all user requests may be issued as shadow requests.

In accordance with various embodiments, processing of the shadow requests may allow an analysis of system performance resulting from operation of each shadow version of the software. For example, two or more shadow versions may be tested to determine which version uses less system resources or based on other factors. System performance may be based on resource consumption such as server workload, processor workload, memory allocation storage use, bandwidth, response time, and so forth. System performance may be analyzed using business metrics, system level metrics (e.g., memory, processor, etc.), and/or application level metrics (e.g., bugs, errors, etc.). In various embodiments, the analysis may perform stress testing on the shadow version using real traffic patterns of users that interact with the live version of the software.

In some embodiments, a controller may reallocate hardware, such as servers, processing time, or other hardware or hardware controls to accommodate processing of the shadow requests using the shadow version of software, particularly when the allocation rules are adjusted to increase the shadow requests. The allocation of hardware may or may not be proportional to the increase of the shadow requests depending on factors such as an analysis of the system performance resulting from operation of the shadow version or other factors.

The techniques and systems described herein may be implemented in a number of ways. Example implementations are provided below with reference to the following figures.

Illustrative Environment

Figure 1:
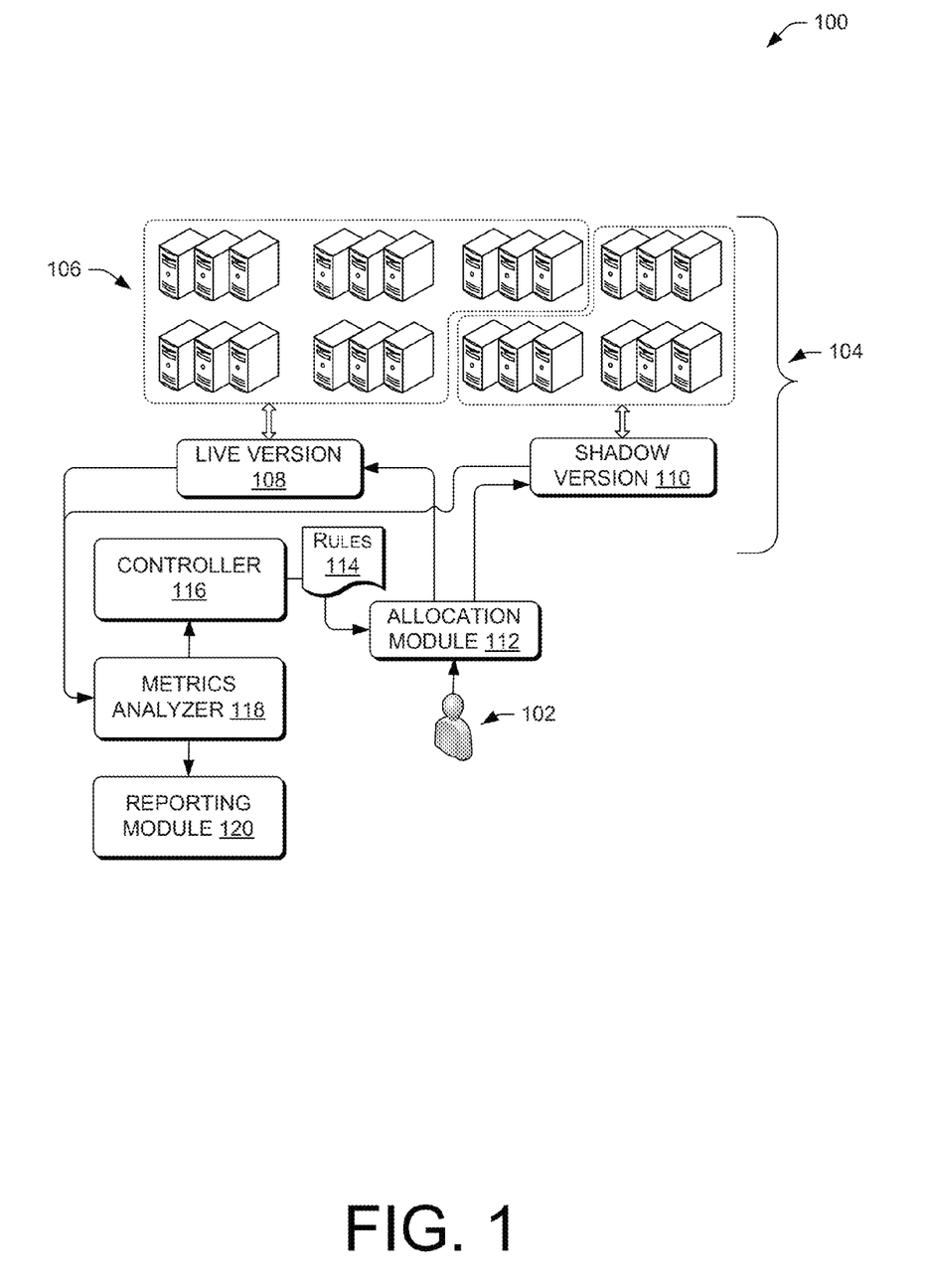
FIG. 1 is a schematic diagram of an illustrative environment that provides software testing of one or more versions of software using shadow requests.

FIG. 1 is a schematic diagram of an illustrative environment 100 that provides software testing of one or more versions of software using shadow requests. As shown in FIG. 1, a downstream consumer or user 102 (referred to collectively as "user") may transmit a request via a user device for electronic data from a service 104. However, in some embodiments, the request may be a request generated by another service, the service 104, or another process, and may not be a human-generated request. Each of the users 102 may be associated with one or more user devices, which may include any number of components such as the one or more processor(s), computer-readable media, network interfaces, and/or displays. The users 102 may utilize the user devices to interact with the service 104 in any manner. The service 104 may be an electronic marketplace, an electronic financial service, a messaging service, a social network, and/or any other service that exchanges electronic data with a user. The service 104 may operate various versions of software that are executable in a framework and processed by system resources 106. The versions may include a live version 108 of software that is currently deployed to fulfill user requests and a shadow version 110 of software that is being tested to measure system performance.

The service 104 may deploy an allocation module 112 to allocate shadow requests for some users to the shadow version 110 while also processing the users' requests using the live version 108. In accordance with embodiments, the shadow request may be similar to or the same as the request processed by the live version of the software. However, the shadow request may include a marker that distinguishes the shadow request from an actual request. The allocation may be made based at least in part on allocation rules 114, in accordance with various embodiments. For example, the user 102 may submit a request to the service 104. The allocation module 112 may transmit the request to the live version for fulfillment of the request. In some instances, the allocation module 112 may also issue a shadow request in addition to transmitting the request to the live version. The shadow request may call the shadow version 110, which may also attempt to satisfy the user's request. However, unlike the live version 108, the shadow version 110 does not transmit data back to the user. Instead, the shadow version 110 is operated without a user output to test system performance when running the shadow version of software. In some embodiments, the live version 108 and the shadow version 110 may be different versions of software that perform a same or similar function, but perform the function using different processes, algorithms, and/or techniques.

The allocation rules 114 may include rules that provide load balancing, desired scheduling, management of sample sizes, initiation of shadow requests based on statistical trends, and/or use other data when determining when to initiate a shadow request. In accordance with various embodiments, a controller 116 may manage and update the allocation rules 114.

After the user 102 interacts with a version of the software (e.g., the live version 108 or the shadow version 110, etc.), then a metrics analyzer 118 may obtain and analyze resultant data from the processing of the request by the particular version of software. The resultant data may include data related to system performance associated with the user interaction and the software version (e.g., load on processors, response time, bug detection, etc.). The metrics analyzer 118 may determine trends with the resultant data in accordance with a confident level. In some embodiments, the metrics analyzer 118 may determine or identify shortcomings in sample sizes of analyzed results.

In accordance with one or more embodiments, the metrics analyzer 118 may output results to the controller 116. The controller 116 may then use the results to update the allocation rules 114 and/or to perform other functions, such as allocate or reallocate system resources (hardware). As shown in FIG. 1, each of the live version 108 and the shadow version 110 is associated with system resources 106. The system resources 106 may be cloud computing services, server farm(s), or other types of resources that can be allocated to execute the various versions of the software. For example, the controller 116 may allocate a percentage, computational time value, or other amount of the system resources 106 to perform the shadow requests using the shadow version. As more shadow requests are allocated by the allocation module 112, the controller 116 may reallocate more system resources to the shadow version 110 of the software. Thus, the controller 116 may manage the allocation rules 114 and reallocate the system resources 106 to accommodate implementation of the allocation rules 114 by the allocation module 112. The allocation of the system resources 106 may be any type of allocation, such that a single server may be allocated, in part, to service requests for each of the versions or to service requests for only a specified version. Thus, one piece of hardware may perform operations for various versions of software in accordance with some embodiments.

In various embodiments, the metrics analyzer 118 may output results to a reporting module 120. The reporting module 120 may generate reports for each version of the software related to system performance and possibly other factors. The data from the reporting module 120 may be used by an administrator or other person, who may then provide input to the controller 116 to adjust the allocation rules 114. Thus, the controller 116 may update the allocation rules 114 dynamically based on data received directly from the metrics analyzer 118 and/or based on user input received from an administrator or other person, who may have access to reports generated by the reporting module 120.

Figure 2:
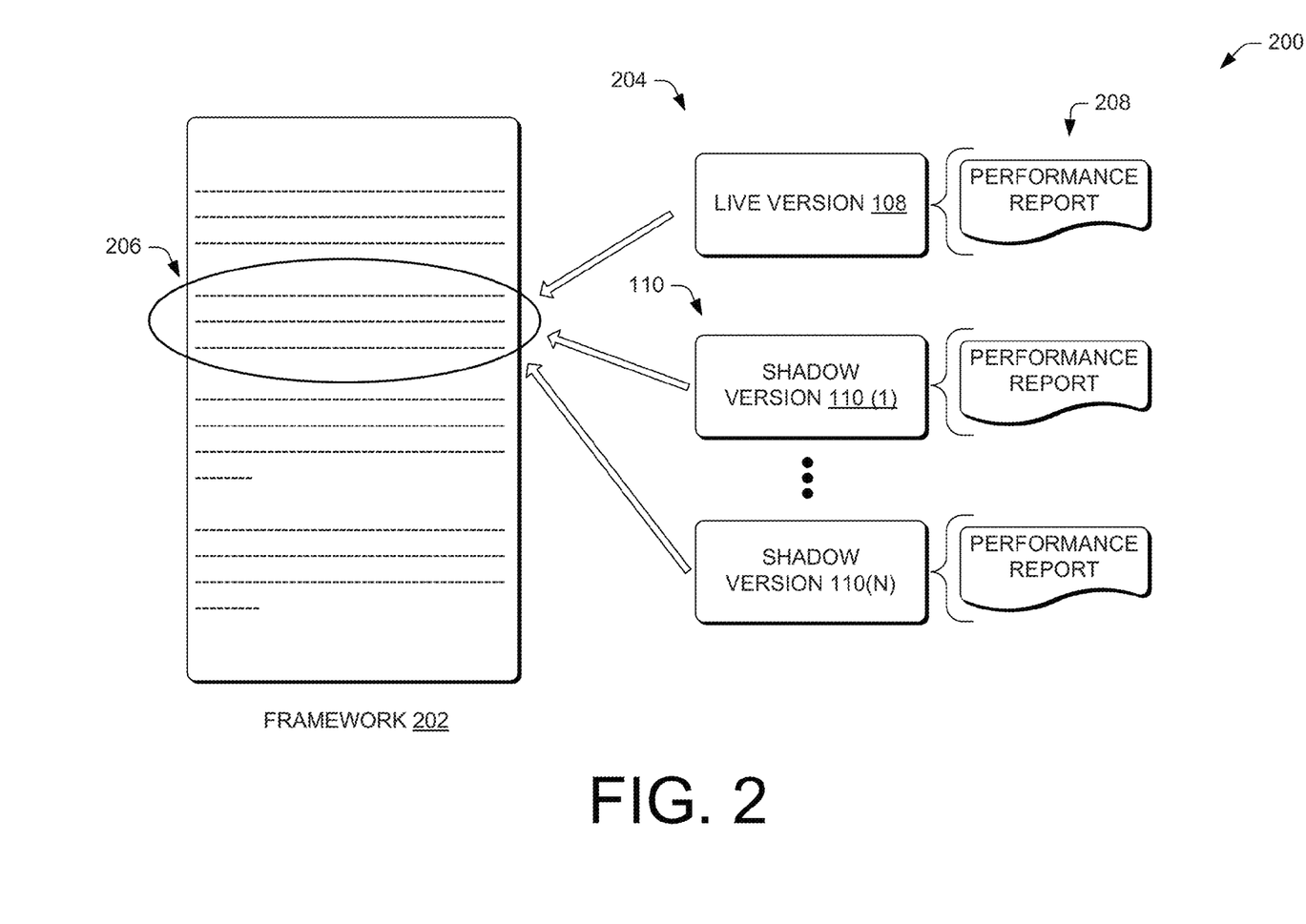
FIG. 2 is a schematic diagram of illustrative software that includes a framework and various versions of software components that may be used interchangeably with the framework during software testing.

FIG. 2 is a schematic diagram of illustrative software 200 that includes a framework 202 and various versions of software 204 that may be used interchangeably with the framework during software testing. The framework 202 may be configured to allow use of the different versions of the software 204, such as the live version 108 and the shadow version 110. In some embodiments, multiple shadow versions may be used, such as first shadow version 110(1), . . . and a last shadow version 110(n). Any number of shadow versions of software may be tested during a testing cycle. The framework may include a call 206, which may direct execution of one of the versions of software 204 based on the outcome of the allocation module 112 as discussed above. The allocation module 112 may determine the software version at any point in time before the call 206 to the software version. In some embodiments, the allocation module 112 may determine the software version prior to a point of execution of the software version (e.g., as an initial operation rather than just prior to execution of the software version). The versions of the software 204 may be stand-alone software that can be implemented or deployed without modification of the code in a selected version of the software.

In accordance with various embodiments, each version of software may include a performance report 208. The performance report 208 may be a combined report that list each version of software together or may be separate reports for each version of the software. The reporting module 120 may generate the performance report 208, which may provide data used to update the allocation rules 114 for the software versions. For example, when the performance report 208 for the shadow version 110 indicates intensive use of system resources, the allocation rules 114 may be modified to reduce shadow requests.

Illustrative Computing Architecture

Figure 3:
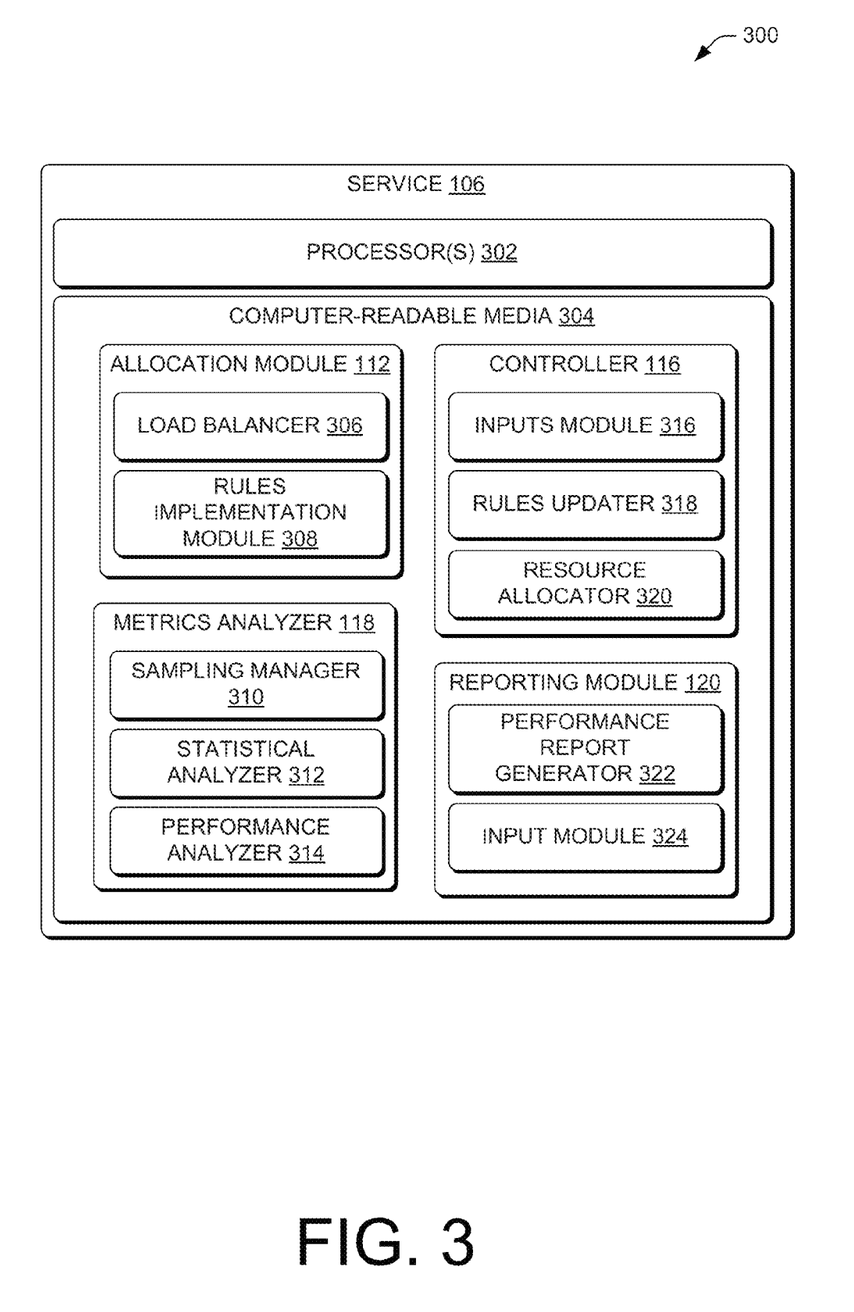
FIG. 3 is a schematic diagram of an illustrative computing architecture to provide software testing of one or more versions of software using shadow requests.

FIG. 3 is a schematic diagram of an illustrative computing architecture 300 to provide software testing of one or more versions of software using shadow requests. The computing architecture 300 may be implemented in a distributed or non-distributed computing environment.

The computing architecture 300 may include one or more processors 302 and one or more computer readable media 304 that stores various modules, applications, programs, or other data. The computer-readable media 304 may include instructions that, when executed by the one or more processors 302, cause the processors to perform the operations described herein for the service 104. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by Internet download.

In some embodiments, the computer-readable media 304 may store the allocation module 112 and associated components, the metrics analyzer 118 and associated components, the controller 116 and associated components, and the reporting module 120 and associated components, which are described in turn. The components may be stored together or in a distributed arrangement.

Illustrative Components of the Allocation Module

In accordance with various embodiments, the allocation module 112 may include a load balancer 306 and a rules implementation module 308.

The load balancer 306 may allocate shadow requests based on availability of the system resources or other factors to ensure minimal disruption, delay, or latency when allocating the shadow requests. In some instances, the load balancer 306 may override implementation of an allocation rule in order to prevent a delay or latency that exceeds a threshold value or when system performance is not within a threshold range of values.

The rules implementation module 308 may receive, interpret, and apply the allocation rules 114 that are generated by the controller 116. For example, the rules implementation module 308 may access the allocation rules 114 that are maintained by the controller 116 and updated as discussed below.

Illustrative Components of the Metrics Analyzer

In accordance with various embodiments, the metrics analyzer 118 may include a sampling manager 310, a statistical analyzer 312, and a performance analyzer 314.

The sampling manager 310 may obtain data and generate metrics from the use of the versions of the software. The sampling manager 310 may receive a predetermined confidence level and then calculate the number of samples necessary to achieve the predetermined confidence level. Generally, the sampling manager 310 may look at the raw data from use of the various versions of software and then output shadow request based on factors such as a confidence level.

The statistical analyzer 312 may determine positive or negative trends for each version of the software. For example, the statistical analyzer 312 may determine that a particular input to a shadow request is indicative or correlated with a particular outcome (either good or bad). The statistical analyzer 312 may then indicate or record the trend to enable the controller 116 to adjust the allocation rules 114 accordingly. The statistical analyzer 312 may also use confidence levels when determining the trends.

The performance analyzer 314 may determine or measure performance trends based on performance of each of the various versions of the software. The performance analyzer 314 may determine how the system resources are responding to use of the versions of software, include processing of spikes in user activity, response time, memory allocation, throughput, bandwidth, or other system performance measurement attributes. The system performance may be analyzed using business metrics, system level metrics (e.g., memory, processor, etc.), and/or application level metrics (e.g., bugs, errors, etc.). The performance analyzer 314 may also determine when one of the shadow versions of the software includes a bug or other error.

Illustrative Components of the Controller

In accordance with various embodiments, the controller 116 may include an inputs module 316, a rule updater 318, and a resource allocator 320.

The inputs module 316 may receive inputs from the metrics analyzer 118 and/or from an administrator or other person via the reporting module 120. The inputs module 316 may format the inputs to facilitate update of the allocation rules 114. The inputs module 316 may access a schedule that provides a ramp up or ramp down of the shadow requests.

The rule updater 318 may update the allocation rules 114, such as by creating new allocation rules or modifying existing allocation rules. For example, the rule updater 318 may adjust a percentage of shadow requests or quantity of shadow requests directed at a particular shadow version when multiple shadow versions are tested by the service 104. The rule updater 318 may transmit the updated allocation rules to the allocation module 112 or make the updated rules available for use by the allocation module 112. In some embodiments, the rule updater 318 may modify the allocation rules to decrease an allocation of the users to a version of software when the version of software is determined to have an anomaly in a use of the system resources 106 per user than another version of the of software based on metrics associated with system performance.

In some embodiments, the rule updater 318 may update the allocation rules 114 to gradually increase allocations to the shadow version of software. For example, a testing cycle may begin with an allocation of 0% and then over time gradually ramp up the allocation of shadow request to 50% of the requests received from the users based on using scheduled guidelines (e.g., increase percent after every x number of users, y minutes, etc.). When the shadow version continues to perform well (e.g., no bugs, good system performance, etc.), then the rule updater 318 may continue update the allocation rules to implement a gradual ramp up of allocations via shadow request to the shadow version to 100%.

The resource allocator 320 may allocate or reallocate the system resources 120 to support execution and performance of the versions of software. The resource allocator 320 may use the allocation rules 114 (and any updates thereto) to determine the resource allocation. The resource allocator 320 may monitor system performance, such as via data from the performance analyzer 314 to determine allocations or reallocations of the system resources 120.

Illustrative Components of the Reporting Module

In accordance with various embodiments, the reporting module 120 may include a performance report generator 322 and an input module 324.

The performance report generator 322 may generate a performance report, which may be based at least in part on an output of the performance analyzer 314.

The input module 324 may enable an administrator or other person to update allocation rules or make other changes to any of the modules discussed herein. For example, the administrator or other person may view the various reports and then make changes to the input module 324 that may not otherwise be automatically updated by the rules updater 318 via the controller 116 without human intervention. Thus, the input module 324 may enable a manual override to automated updates to the allocation rules 114.

Illustrative Operation

FIGS. 4-7 are flow diagrams of illustrative processes to provide software testing of one or more versions of software using shadow requests. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

The processes are described with reference to the environment 100 and may be performed by the service 104 using the allocation module 112, the controller 116, the metrics analyzer 118, and/or the reporting module 120. Of course, the processes may be performed in other similar and/or different environments.

Figure 4:
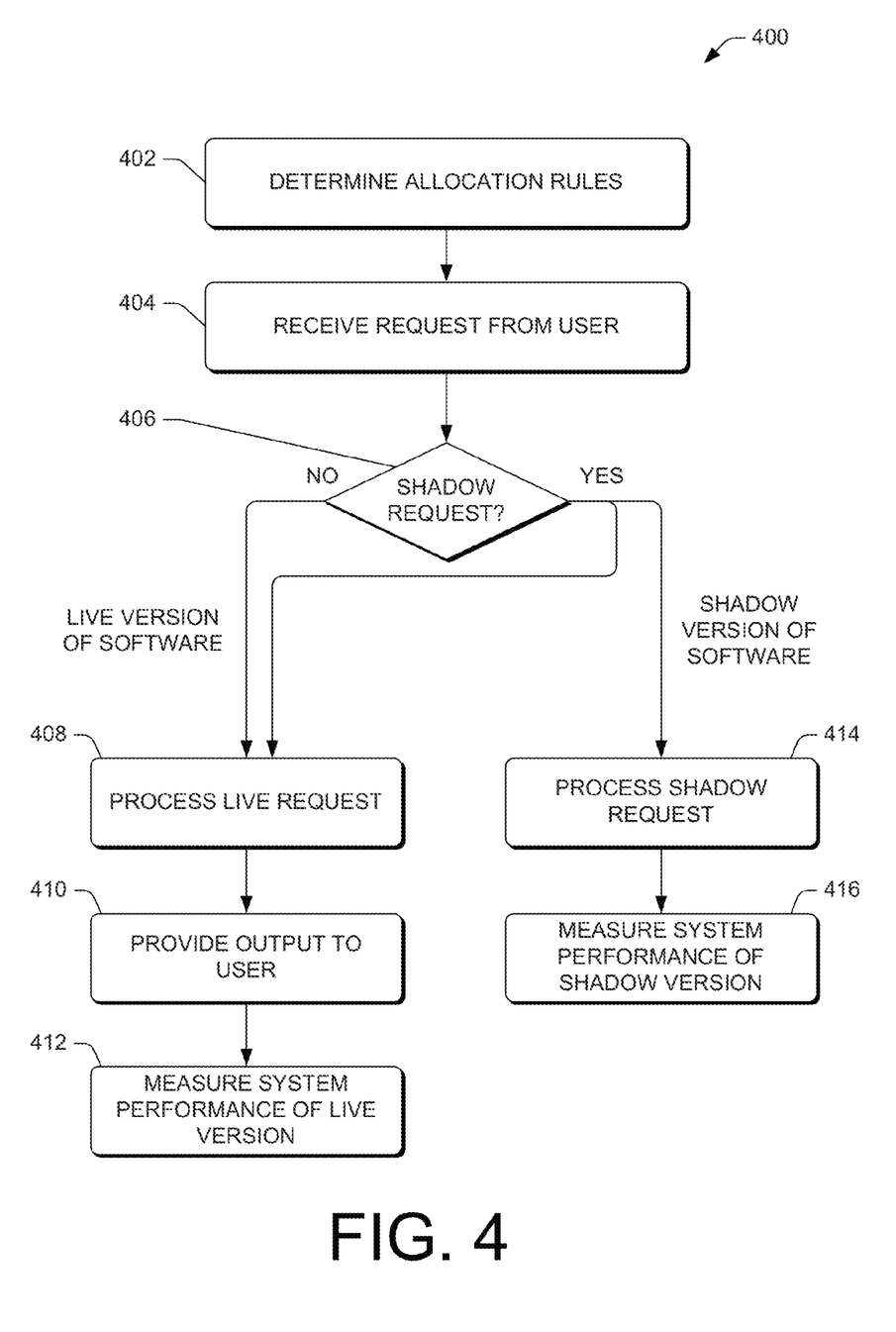
FIG. 4 is a flow diagram of an illustrative process to determine when to initiate a shadow request while processing a request using a live version of software.

FIG. 4 is a flow diagram of an illustrative process 400 to determine when to initiate a shadow request while processing a request using a live version of software.

At 402, the allocation module 112 may determine the allocation rules 114. The allocation module 112 may receive the allocation rules 114 from the controller 116 or may access the controller to obtain the rules (e.g., shared copy).

At 404, the allocation module 112 may receive a request from a user (e.g., the user 102). The request may be for use of software that includes the live version 108 of the software and the shadow version 110 of the software.

At 406, the allocation module 112 may determine whether to allocate a shadow request based at least in part on the allocation rules 114. When the allocation module 112 determines not to allocate the shadow request (following the "no" route), then processing continues at an operation 408.

At 408, the service 104 may process the live request using the live version 108 of software. At 410, the service 104 may provide an output to the user in response to processing the live request. At 412, the metrics analyzer 118 may measure system performance of the system resources 106 used by the live version 110. For example, the performance analyzer 314 may measure the system performance of the system resources 106 used by the live version 110.

However, when the allocation module 112 determines to allocate the shadow request (following the "yes" route), then processing continues at an operation 414 as well as at the operation 408 (and then the operation 410 and 412). At 414, the service 104 may process the shadow request using the shadow version 110 of software. Unlike the processing at the operation 408, the processing at the operation 414 is not revealed to the user and/or does not modify data used by the live version of the software. Thus, any outputs and/or manipulations of data from the shadow version are not seen by the user and/or used to generate data that is later output to the user. Instead, the processing by the shadow version 110 is used to test execution of the shadow version and impacts on system performance of the system resources 106. The operations 408 and 414 may be performed by different ones of the system resources 106 based on an allocation of the system resources. The operations 408 and 414 may be performed in parallel, sequentially, or at other times.

Following the completion of the operation 414, the metrics analyzer 118 may measure system performance of the system resources 106 used by the shadow version 110 at 416. For example, the performance analyzer 314 may measure the system performance of the system resources 106 used by the shadow version 110. The system performance metrics of the live version and the shadow version may be compared as one possible analysis of the system performance.

Figure 5A:
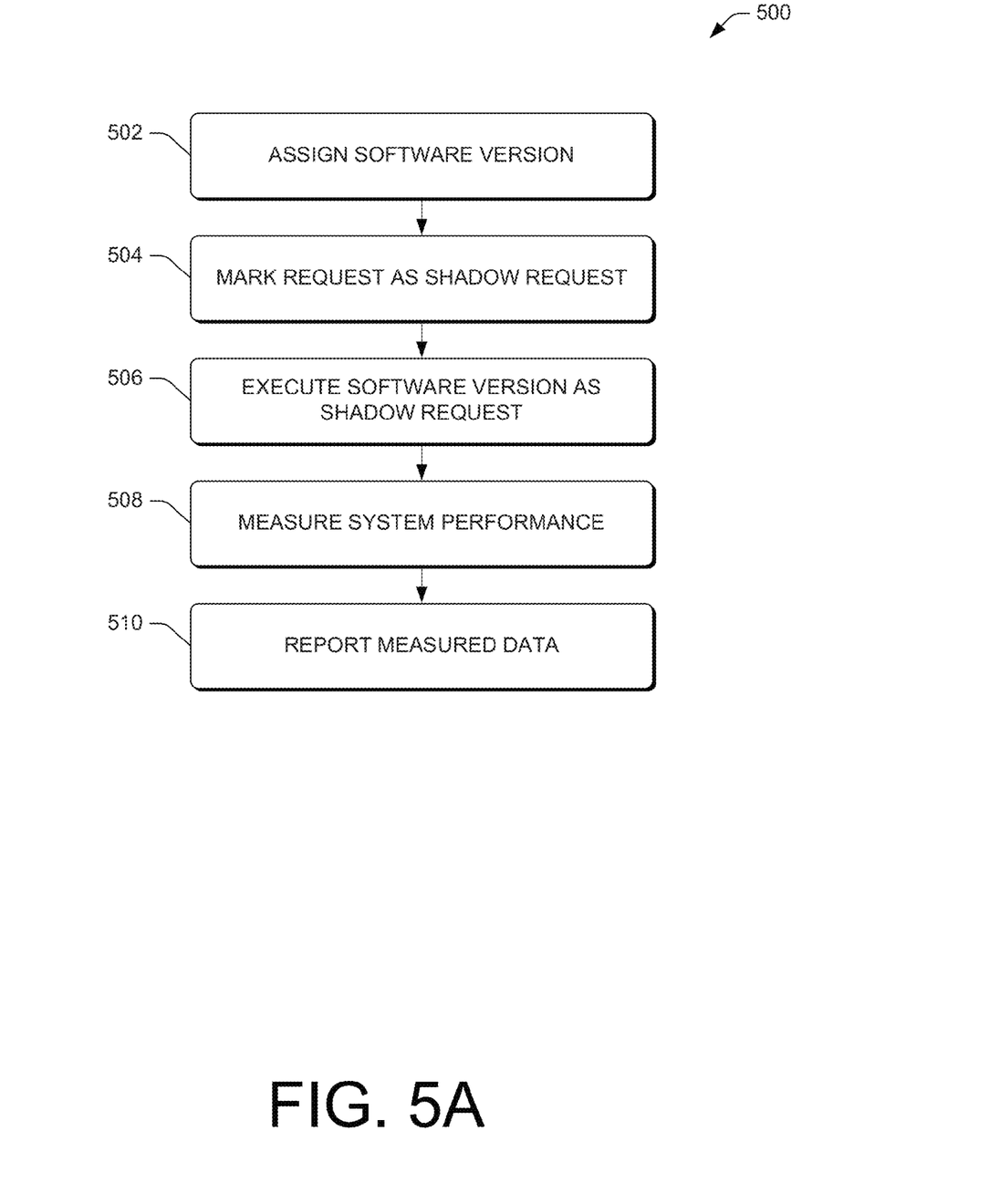
FIGS. 5A and 5B are flow diagrams of illustrative processes to perform the shadow request to test one or more versions of software.
Figure 5B:
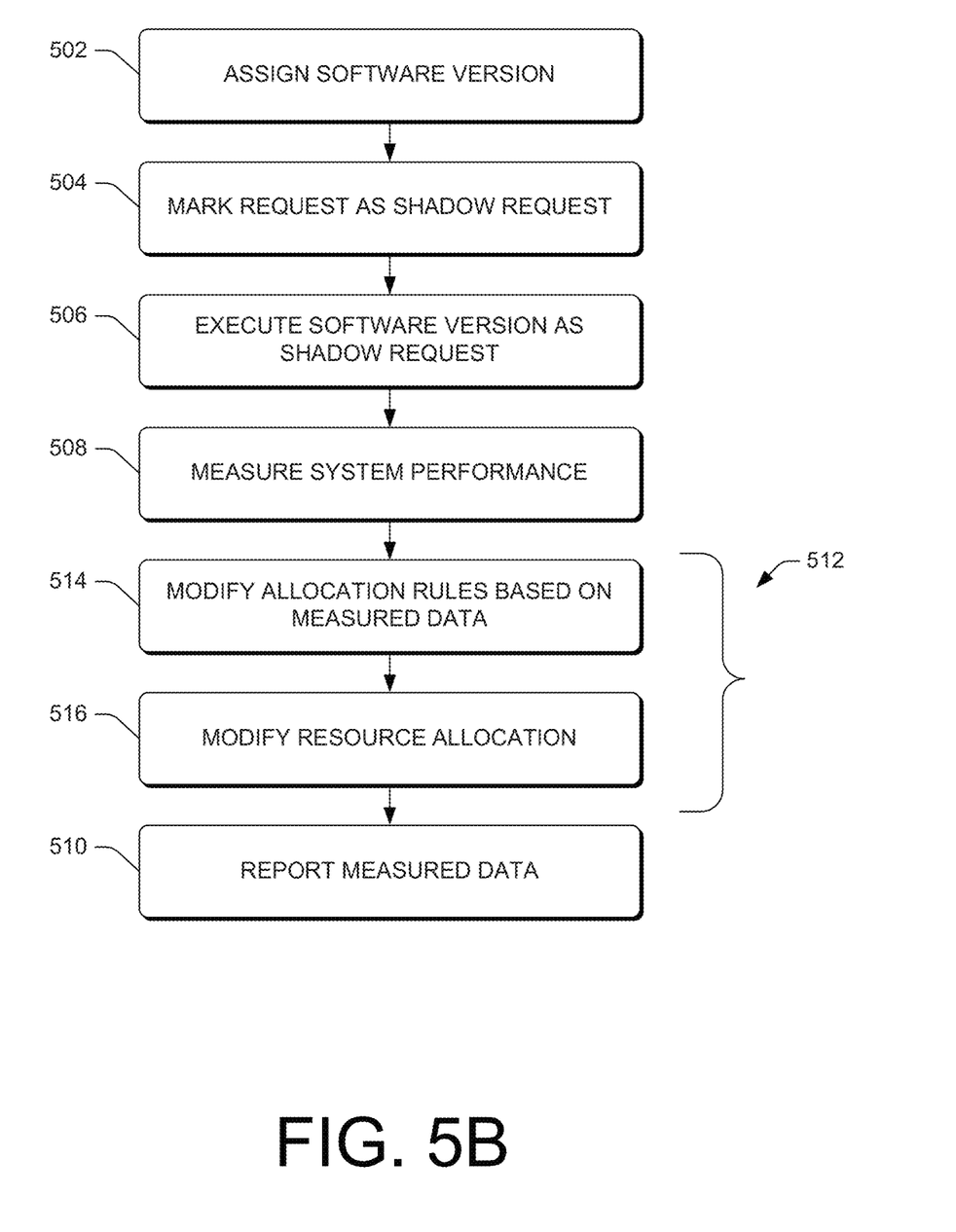

FIGS. 5A and 5B are flow diagrams of illustrative processes to perform the shadow request to test one or more versions of software. In FIG. 5A, a process 500 provides additional details of some operations that may be implemented when the shadow request is issued to cause execution of data by the shadow version 110 of software.

At 502, the allocation module 112 may assign the shadow request to one or more shadow versions of software. For example, the service 104 may test multiple shadow versions concurrently to determine the impact of each shadow version on the system resources 106. However, in some embodiments, only a single shadow version may be tested by the service 104. In some embodiments, the shadow requests may be generated for some or all requests received by the service 104. However, additional shadow request may also be generated in some embodiments, for example to test system performance at levels greater than 100% (e.g., 125%, 200%, etc.). Testing performance of the system using additional shadow request may be used to simulate spikes in traffic (e.g., black Friday shoppers, holiday shoppers, etc.), or for other reasons.

At 504, the allocation module 112 may mark a request as a shadow request using a marker (e.g., a tag, or other type of identifier). In some embodiments, the marker may include a header, such as a hypertext transport protocol (HTTP) header that may designate the request as the shadow request. The shadow version may then use the marker in association with processes performed by the shadow version to prevent undesirable actions, such as updating live data, placing an order, charging a payment, or performing other actions that are not desired during a test of the shadow version. However, some of these functions may be simulated by the shadow version to enable testing of the system performance when implementing the shadow version.

At 506, the service 104 may execute the shadow version 110. The service may execute the shadow version using the shadow request that includes the marker and inputs from the user (or otherwise included in the request).

At 508, the metrics analyzer 118 may measure system performance of the system resources that execute the shadow request. For example, the metrics analyzer 118 may determine metrics such as a response time, processing power, resources consumed, latency, memory use, storage use, bandwidth, and other types of metrics associated with the performance of the system resources.

At 510, the reporting module 120 may report the measured data. The reporting module 120 may use the performance report generator 322 to generate a report that reflects the system performance of the system resources 106 that support the shadow version 110 and/or of the performance of the system resources 106 that support the live version 108 (e.g., for comparison or baseline purposes). In some embodiments, the reporting may create a report of a comparison of results between the shadow version and the live version. For example, the results of each version may be expected to be the same in some instances. The results of the shadow version may be compared to the results of the live version to determine whether the shadow version is operating correctly or incorrectly (e.g., has bugs, errors, etc.) when the results are expected to be the same.

FIG. 5B shows a process 512 that includes the operations described with reference to FIG. 5A with additional operations 514 and 516.

At 514, the controller 116 may modify allocation rules 114 based at least in part on the measured data from the operation

508. The modification of the allocation rules 114 may result in auto-scaling of the shadow request (either up or down), and thereby resulting in more or less processing of the shadow version(s). The modification may be performed manually (i.e., with human input), automatically (i.e., without human input), or a combination thereof).

At 516, the controller 116 may modify allocation of the system resources 120. For example, the controller 116 may modify the allocation of the system resources 106 when the allocation rules 114 are updated and/or in response to information from the performance analyzer 314 performed by the metrics analyzer 118. In some embodiments, the operation 516 may be performed in the process 500 without performing the operation 514.

Figure 6:
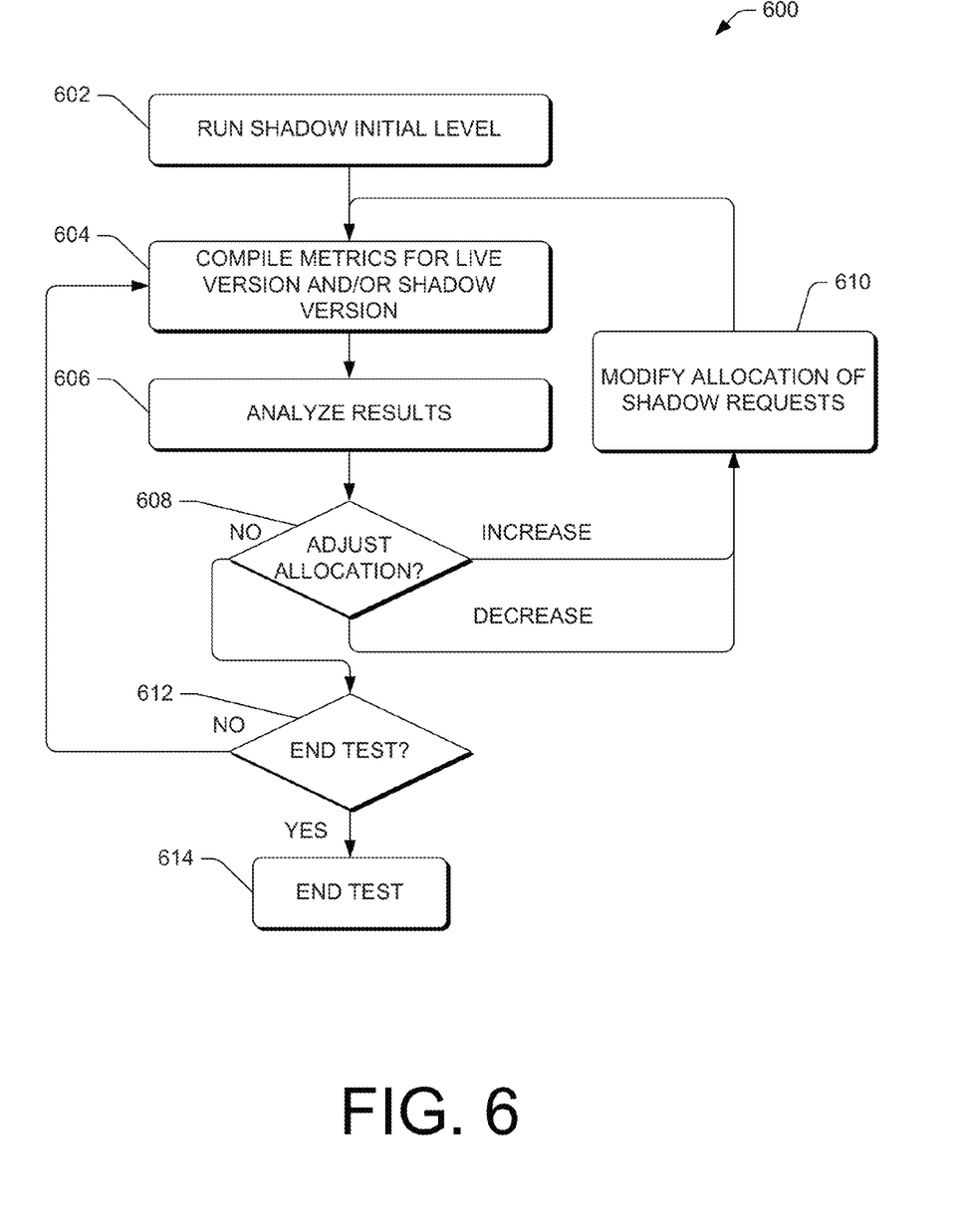
FIG. 6 is a flow diagram of an illustrative process to adjust allocation of shadow requests based at least in part on an analysis of performance and/or a scheduled allocation.

FIG. 6 is a flow diagram of an illustrative process 600 to adjust allocation of shadow requests based at least in part on an analysis of performance and/or a scheduled allocation. The process 600 may implement a scheduled allocation change to gradually start to issue the shadow requests with increasing frequency according to a schedule and subject to various allocation rules.

At 602, the controller 116 may set the allocation rules to run the live version and the shadow version at an initial allocation. For example, the initial allocation may equate to a low percentage of requests resulting in a shadow request which is processed by the shadow version 110 of the software.

At 604, the metrics analyzer 118 may compile metrics for the live version 108 and/or the shadow version 110. Initially, the compiled metrics may create baseline metrics.

At 606, the metrics analyzer 118 may analyze the results, such as by performing statistical analysis, performance analysis, and/or other analysis of the versions and resulting data.

At 608, the controller 116 determines whether to adjust the allocation rules 114. The controller 116 may determine to adjust the allocation rules 114 using a schedule that gradually increases (or decreases) the allocation of the shadow request when the shadow version is operating in accordance with expectations (e.g., same or improved system performance, etc.). The controller 116 may use the data from the metrics analyzer 118 in the determination. When the controller 116 determines to increase the shadow request (following the route "increase" form the decision operation 608), then the allocation of the shadow requests may be increased up to a maximum allocation of 100% at an operation 610. When the controller 116 determines to decrease the allocation of shadow request (following the route "decrease" from the decision operation 608), than the allocation of shadow requests may be decreased down to 0% at the operation 610. The decrease may be due to a detection of a bug, high or unusual drain on the system resources, or for other reasons. At 610, the controller 116 may adjust the allocation of shadow requests, which may be based in part on the schedule that creates a gradual adjustment in the allocation.

When the controller 116 determines to make no changes and maintain the current allocation (following the route "no" from the decision operation 608), then the process 600 may continue at a decision operation 612. At 612, the service 104 may determine to end a test of the shadow version 110. In some embodiments, the test may end when the adjusted allocation creates a shadow request for each user, after passage of a predetermined amount of time, and/or in response to other factors. When the service 104 determines to end the test (following the "yes" route), then the test may end at an operation 614. When the service determine not to end the test (via the "no" route from the decision operation 612), then the process 600 may continue at the operation 604.

Figure 7:
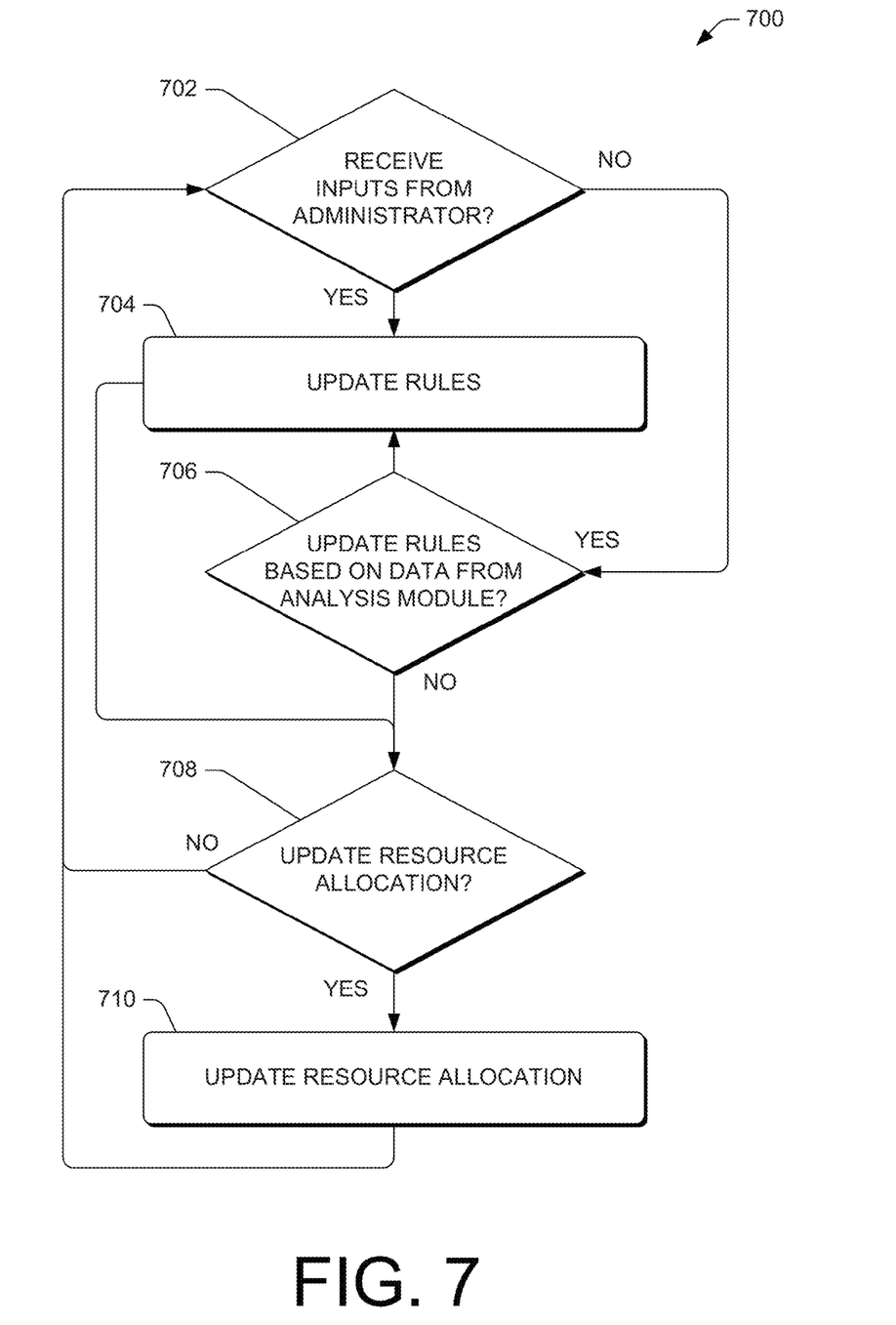
FIG. 7 is a flow diagram of an illustrative process to update rules governing allocation of shadow requests and update resource allocations.

FIG. 7 is a flow diagram of an illustrative process 700 to update rules governing allocation of shadow requests and/or update resource allocations. The process 700 may be implemented by the controller 116 to enable modification or creation of rules of the allocation rules 114.

At 702, the controller 116 may determine whether inputs are received from the input module 324 of the reporting module 120. For example, the inputs may be entered by an administrator or another person and then transmitted to the controller 116 or made available for access by the controller 116. When the inputs are available (via the "yes" route), at 704, then the controller 116 may update the allocation rules 114 based at least in part on the input from the input module 324. When the inputs are not available (via the "no" route from the decision operation 702), then the process 700 may advance to a decision operation 706.

At 706, the controller 116 may determine whether to update the allocation rules 114 based on the data from the analysis module 118. For example, the controller 116 may update the allocation rules 114 according to a schedule to update the allocation of the shadow requests based on the results aggregated by the components of the analysis module 118. When the controller 116 determines to update the allocation rules 114 (via the "yes" route), at 704, then the controller may update the allocation rules based at least in part on the data from the analysis module 118. When the controller 116 determines not to update the allocation rules 114 (via the "no" route from the decision operation 706), then the process 700 may advance to a decision operation 708.

At 708, the controller 116 may determine whether to update an allocation of the system resources 120. The controller 116 may base the determination on the update of the rules at 704 (when the rules are updated) and/or on data from the performance analyzer 314 of the metrics analyzer 118. When the controller 116 determines to update the allocation of the system resources (via the "yes" route), at 710, then the controller may update the allocation of the system resources 120 based at least in part on the data from the analysis module 118. For example, the controller 116 may add more system resources to support the shadow version 110 of software when more shadow requests are to be issued following an update of the allocation rule 114. Following the operation 710, the process 700 may advance to the decision operation 702 to complete a loop process. When the controller 116 determines not to update the allocation of the system resources 120 (via the "no" route from the decision operation 708), then the process 700 may advance to the decision operation 702.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
    under control of one or more servers configured with executable instructions,
    receiving a request to process data;
    processing the request using a live version of software that, when executed, modifies system data;
    issuing a shadow request based at least in part on dynamically updated allocation rules, the shadow request processed by a shadow version of the software that, when executed, does not modify the system data used by the live version of the software, the allocation rules include a scheduled allocation of the shadow requests that is contingent on system performance of the shadow version, the scheduled allocation comprising a scheduled guideline that gradually adjusts issuance of shadow requests over time;

measuring system performance during execution of the shadow version; and outputting results based at least in part on the measuring of the system performance.

2. The method as recited in claim 1, further comprising allocating system resources to execute the shadow version based at least in part on the allocation rules.

3. The method as recited in claim 1, further comprising modifying the dynamic allocation rules based at least in part on the measurement of the system performance.

4. The method as recited in claim 1, wherein the shadow version is a modified test version of the live version of the software.

5. The method as recited in claim 1, wherein shadow request includes a marker that distinguishes the shadow request from the request from the user.

6. The method as recited in claim 1, wherein the scheduled guideline comprises a predefined time period.

7. The method as recited in claim 1, wherein the scheduled guideline comprises a predefined number of users submitting requests to process data.

8. The method as recited in claim 1, wherein the scheduled allocation comprises a plurality of percentage allocation steps having predefined intervals.

9. One or more non-transitory computer-readable media storing computer-executable instructions that, when executed on one or more processors, performs acts comprising:

receiving system performance metrics for a shadow version of software executed by system resources, the shadow version being a test version of a live version of software, the shadow version to test system performance without modifying system data;

dynamically determining an allocation rule based on at least the received system performance metrics and a scheduled allocation of shadow requests, the scheduled allocation of the shadow requests being based at least on the system performance metrics of the shadow version maintaining an acceptable value for at least one of a predefined time period or a predefined number of users submitting requests to the live version;

issuing shadow requests using the dynamically determined allocation rule for a subset of requests to direct processing to the shadow version for the subset of the requests; and executing the live version of software for all of the requests, the live version modifying the system data.

10. The one or more non-transitory computer-readable media as recited in claim 9, further comprising reallocating system resources based at least in part on the system performance metrics.

11. The one or more non-transitory computer-readable media as recited in claim 9, further comprising updating an allocation rule based at least in part on the system performance metrics.

12. A system comprising:

memory;

one or more processors;

one or more modules maintained in the memory and executed by the one or more processors to, receive a plurality of requests to process data;

process the plurality of requests using a live version of software that, when executed, modifies system data;

issue a shadow request based at least in part on dynamically updated allocation rules, the shadow request processed by a shadow version of the software that, when executed, does not modify the system data used by the live version of the software, the allocation rules include a scheduled allocation of the shadow requests that is contingent on system performance of the shadow version, the scheduled allocation comprising a scheduled guideline that gradually adjusts issuance of shadow requests over time;

measure system performance during execution of the shadow version; and output results based at least in part on the measuring of the system performance.

13. The system as recited in claim 12, wherein the one or more modules allocate system resources to execute the shadow version based at least in part on the allocation rules.

14. The system as recited in claim 12, wherein one or more modules modify the dynamic allocation rules based at least in part on the measurement of the system performance.

15. The system as recited in claim 12, wherein the shadow version is a modified test version of the live version of the software.

16. The system as recited in claim 12, wherein shadow request includes a marker that distinguishes the shadow request from the plurality of requests from the user.

17. The system as recited in claim 12, wherein the scheduled guideline comprises a predefined time period.

18. The system as recited in claim 12, wherein the scheduled guideline comprises a predefined number of users submitting requests to process data.

19. The system as recited in claim 12, wherein the scheduled allocation comprises a plurality of percentage allocation steps having predefined intervals.

20. The system as recited in claim 12, wherein the one or more modules measure system performance metrics caused by the shadow version of the software and increase an initial percentage of the plurality of requests used to create shadow requests when the measured system performance metrics indicate acceptable performance.

* * * * *